(12) United States Patent
March et al.

(10) Patent No.: US 11,156,342 B2
(45) Date of Patent: Oct. 26, 2021

(54) ILLUMINATION DEVICE FOR A SIMULATION ARRANGEMENT FOR MOTOR VEHICLE ACCIDENTS

(71) Applicants: ATLAS Material Testing Technology GmbH, Linsengericht-Altenhaßlau (DE); Peter March, Frankfurt a. Main (DE); Bernd Rudolph, Alzenau (DE)

(72) Inventors: Peter March, Frankfurt a. Main (DE); Bernd Rudolph, Alzenau (DE)

(73) Assignee: ATLAS MATERIAL TESTING TECHNOLOGY GMBH, Linsengericht (DE)

( * ) Notice: Subject to any disclaimer, the term of this patent is extended or adjusted under 35 U.S.C. 154(b) by 0 days.

(21) Appl. No.: 16/636,456

(22) PCT Filed: Jul. 31, 2018

(86) PCT No.: PCT/EP2018/070680
§ 371 (c)(1),
(2) Date: Feb. 4, 2020

(87) PCT Pub. No.: WO2019/025412
PCT Pub. Date: Feb. 7, 2019

(65) Prior Publication Data
US 2020/0173631 A1 Jun. 4, 2020

(30) Foreign Application Priority Data
Aug. 4, 2017 (EP) .................................. 17184909

(51) Int. Cl.
*F21V 14/02* (2006.01)
*F21S 8/06* (2006.01)
(Continued)

(52) U.S. Cl.
CPC .............. *F21V 14/02* (2013.01); *F21S 8/063* (2013.01); *F21V 21/15* (2013.01); *F21V 23/003* (2013.01);
(Continued)

(58) Field of Classification Search
CPC ........ G03B 15/02; G03B 15/16; G03B 15/07; F21V 23/003; F21V 19/02; F21V 21/15;
(Continued)

(56) References Cited

U.S. PATENT DOCUMENTS

2005/0029459 A1 2/2005 Gotz et al.
2005/0116176 A1 6/2005 Aguirre et al.
(Continued)

FOREIGN PATENT DOCUMENTS

CN 104879689 A 9/2015
CN 105090825 A 11/2015
(Continued)

OTHER PUBLICATIONS

International Search Report and Written Opinion with English Translation of ISR, cited in PCT/EP2018/070680 dated Nov. 7, 2018, 15 pages.

*Primary Examiner* — Sang H Nguyen
(74) *Attorney, Agent, or Firm* — Cooper Legal Group, LLC (57) ABSTRACT

The illumination device comprises a plurality of illumination units (21), each illumination unit (21) comprising a light source (21.1) for emitting a radiation beam (21.1A) and at least one laser beam source (21.2) for emitting at least one laser beam (21.2A), and a plurality of actuator means (22), wherein each actuator means (22) is connected to an illumination unit (21) and is adapted to change an orientation of the illumination unit (21) based on a detected beam direction of the laser beam (21.2A).

17 Claims, 7 Drawing Sheets

(51) Int. Cl.

| | | |
|---|---|---|
| *F21V 21/15* | (2006.01) | |
| *F21V 23/00* | (2015.01) | |
| *G03B 15/07* | (2021.01) | |
| *G03B 15/16* | (2021.01) | |
| *F21Y 115/30* | (2016.01) | |
| *F21Y 105/16* | (2016.01) | |
| *F21Y 115/10* | (2016.01) | |
| *F21W 131/40* | (2006.01) | |

(52) U.S. Cl.
CPC ............ *G03B 15/07* (2013.01); *G03B 15/16* (2013.01); *F21W 2131/40* (2013.01); *F21Y 2105/16* (2016.08); *F21Y 2115/10* (2016.08); *F21Y 2115/30* (2016.08)

(58) Field of Classification Search
CPC ..... F21V 14/02; F21S 8/063; F21W 2131/40; F21Y 2105/16; F21Y 2115/10; F21Y 2115/30
See application file for complete search history.

(56) References Cited

U.S. PATENT DOCUMENTS

| | | | |
|---|---|---|---|
| 2008/0121826 A1* | 5/2008 | Manley | G01S 3/789 |
| | | | 250/551 |
| 2008/0253418 A1* | 10/2008 | Egawa | H01S 5/0683 |
| | | | 372/38.02 |
| 2012/0206050 A1 | 8/2012 | Spero | |
| 2012/0269213 A1* | 10/2012 | Yamashita | G06K 15/1214 |
| | | | 372/9 |
| 2014/0362600 A1* | 12/2014 | Suckling | F21S 41/16 |
| | | | 362/583 |
| 2015/0092428 A1 | 4/2015 | Holt | |
| 2015/0172524 A1* | 6/2015 | Rentschler | H04N 5/2354 |
| | | | 348/231.6 |
| 2015/0197182 A1* | 7/2015 | Jones | B60Q 1/444 |
| | | | 340/908 |
| 2015/0270682 A1* | 9/2015 | Daniels | F21S 41/16 |
| | | | 353/99 |
| 2016/0323972 A1* | 11/2016 | Bora | F21V 7/00 |
| 2018/0068142 A1* | 3/2018 | Ishikake | G06K 7/01 |
| 2018/0159303 A1* | 6/2018 | Kim | H01S 5/423 |
| 2018/0224080 A1* | 8/2018 | Reisinger | F21S 41/176 |
| 2018/0295331 A1* | 10/2018 | Tardif | H04N 9/3135 |
| 2018/0302158 A1* | 10/2018 | Norval | H04B 10/516 |
| 2019/0143885 A1* | 5/2019 | Sugimoto | F21S 41/143 |
| | | | 362/466 |
| 2019/0361395 A1* | 11/2019 | Kurashige | F21V 14/02 |

FOREIGN PATENT DOCUMENTS

| | | |
|---|---|---|
| CN | 105556204 A | 5/2016 |
| CN | 106461184 A | 2/2017 |
| DE | 102010030861 A1 | 1/2012 |
| DE | 102016200590 A1 | 7/2017 |
| JP | 2009245803 A | 10/2009 |
| JP | 2013101793 A | 5/2013 |
| JP | 2013134912 A | 7/2013 |
| JP | 2016066483 A | 4/2016 |
| WO | 2017101773 A1 | 6/2017 |

\* cited by examiner

Fig. 4

ILLUMINATION DEVICE FOR A SIMULATION ARRANGEMENT FOR MOTOR VEHICLE ACCIDENTS

TECHNICAL FIELD

The present disclosure refers to an illumination or lighting device, in particular for use in a simulation arrangement for motor vehicle accidents, an illumination or lighting unit for such an illumination device, and a method for adjusting such an illumination device.

BACKGROUND

Methods and devices for testing the effects of a motor vehicle accident have long been known, which are traditionally known by the abbreviations crash test and crash test facility. In such a crash test, a motor vehicle is guided to a predefined collision point with its own drive system. The moment of collision is recorded with special high-speed cameras, typically with a recording frequency of between 1000 and 2000 frames per second, in order to record as many details as possible, so that the effects of the collision can be analyzed very precisely.

The use of such high-speed cameras with their short exposure times requires an intensive and homogeneous illumination of the entire vehicle at the time of the collision. For this purpose, a lighting device is provided, which consists of a number of lighting units, which are usually attached to a rail suspended from a hall ceiling. Each of these lighting units directs a beam of radiation onto a section of the motor vehicle. The aim is to achieve a spatially as homogeneous illumination of the entire area of the motor vehicle as possible.

SUMMARY

According to a first aspect of the disclosure, a lighting or illumination device comprises a plurality of lighting or illumination units, each lighting unit comprising a light source for emitting a radiation beam and at least one laser beam source for emitting at least one laser beam, and a plurality of actuator means, each actuator means being connected to a lighting unit and being adapted to change an orientation of the lighting unit based on a detected beam direction of the laser beam.

According to a second aspect of the disclosure, a lighting unit comprises a light source for emitting a radiation beam and a laser beam source for emitting a laser beam, the laser beam source being arranged and adapted to mark, by means of the emitted laser beam, the spatial extension of the radiation beam at a distance from the lighting unit.

According to a third aspect of the disclosure, a method of adjusting a lighting device comprising a plurality of lighting or illumination units each comprising a light source and a laser beam source, emitting laser beams from the laser beam sources, detecting beam directions of the laser beams, and changing the orientations of the illumination units depending on the detected beam directions of the laser beams.

According to a fourth aspect of the disclosure, a simulation arrangement for motor vehicle accidents comprises a lighting or illumination device according to the first aspect of the disclosure.

The expert recognizes additional features and advantages when reading the following detailed description and the enclosed drawings.

BRIEF DESCRIPTION OF THE DRAWINGS

The enclosed drawings are examples of embodiments and, together with the description, serve to explain principles of the present disclosure as well as details of the examples of embodiments.

DETAILED DESCRIPTION

In the following detailed description, reference is made to the attached drawings, which form part of these and in which, for illustration, specific examples are shown in which the present disclosure can be exercised. In this respect, directional terminology such as "top", "bottom", "front", "back", "front", "rear", etc. is used in relation to the orientation of the figure(s) described. Since components of examples of the present disclosure can be positioned in a number of different orientations, the terminology of direction is for illustration and is not restrictive in any way. It is understood that other examples of embodiments may be used and structural or logical changes may be made without departing from the scope of protection of the present disclosure. The following detailed description is therefore not to be understood in a restrictive sense and the scope of protection of the present disclosure is defined by the attached claims.

To the extent that the following description, claims or drawings express that circuit elements are "connected", "electrically connected" or "electrically coupled" to each other, this may mean that the mentioned elements are directly coupled, i.e. without further elements in between. However, it may also mean that the said elements are not directly coupled to each other and that further elements are coupled between the said elements. Insofar as the same reference signs are used in the figures, they refer to identical or functionally identical elements, so that in these cases the description of these elements is not repeated.

Figure 1:
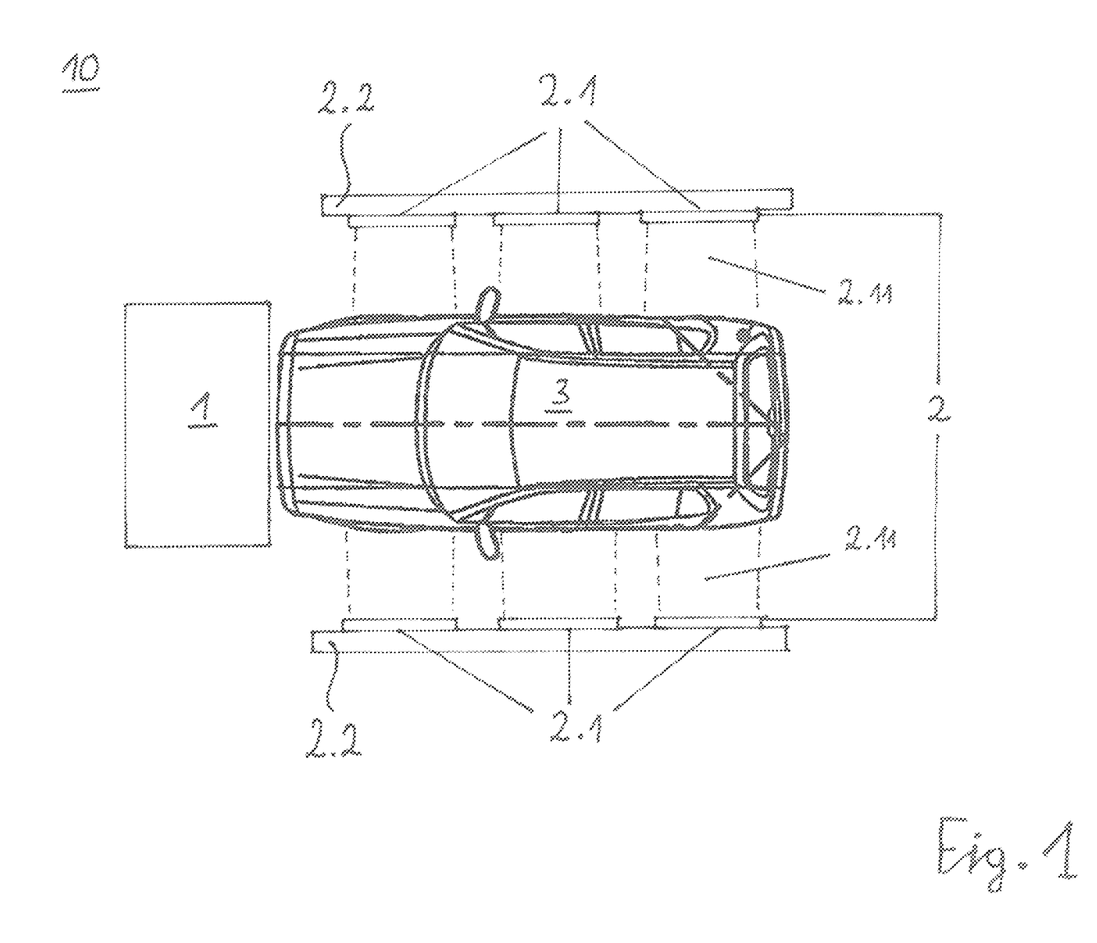
FIG. 1 shows a schematic, top view of a crash test facility.

FIG. 1 shows the essential components of a crash test facility in a schematic and simplified form. The chosen representation is only intended to clarify the starting point for the present disclosure. A crash test system 10 has a collision point 1, a lighting device 2 and a number of high-speed cameras (not shown), which are intended to record the moment of impact of a motor vehicle 3 on the collision point 1. The collision point 1 may be a fixed immovable obstacle or another vehicle. Lighting device 2 may comprise a plurality of lighting units 2.1, for example fixed to a rail 2.2, which in turn is suspended from the ceiling of the hall. Three lighting units 2.1 are shown as an example. Each of the lighting units 2.1 emits a beam of radiation 2.11 in the direction of the motor vehicle 3. The lighting units 2.1 may, for example, contain halogen gas discharge lamps operated with special ballasts or light emission diodes (LED), in particular white light LEDs. In order to achieve the most homogeneous possible illumination of the area of motor vehicle 3 by the lighting units 2.1, their beam 2.11 should be adjacent to each other in the area of motor vehicle 3 as completely and overlap-free as possible.

Figure 2A:
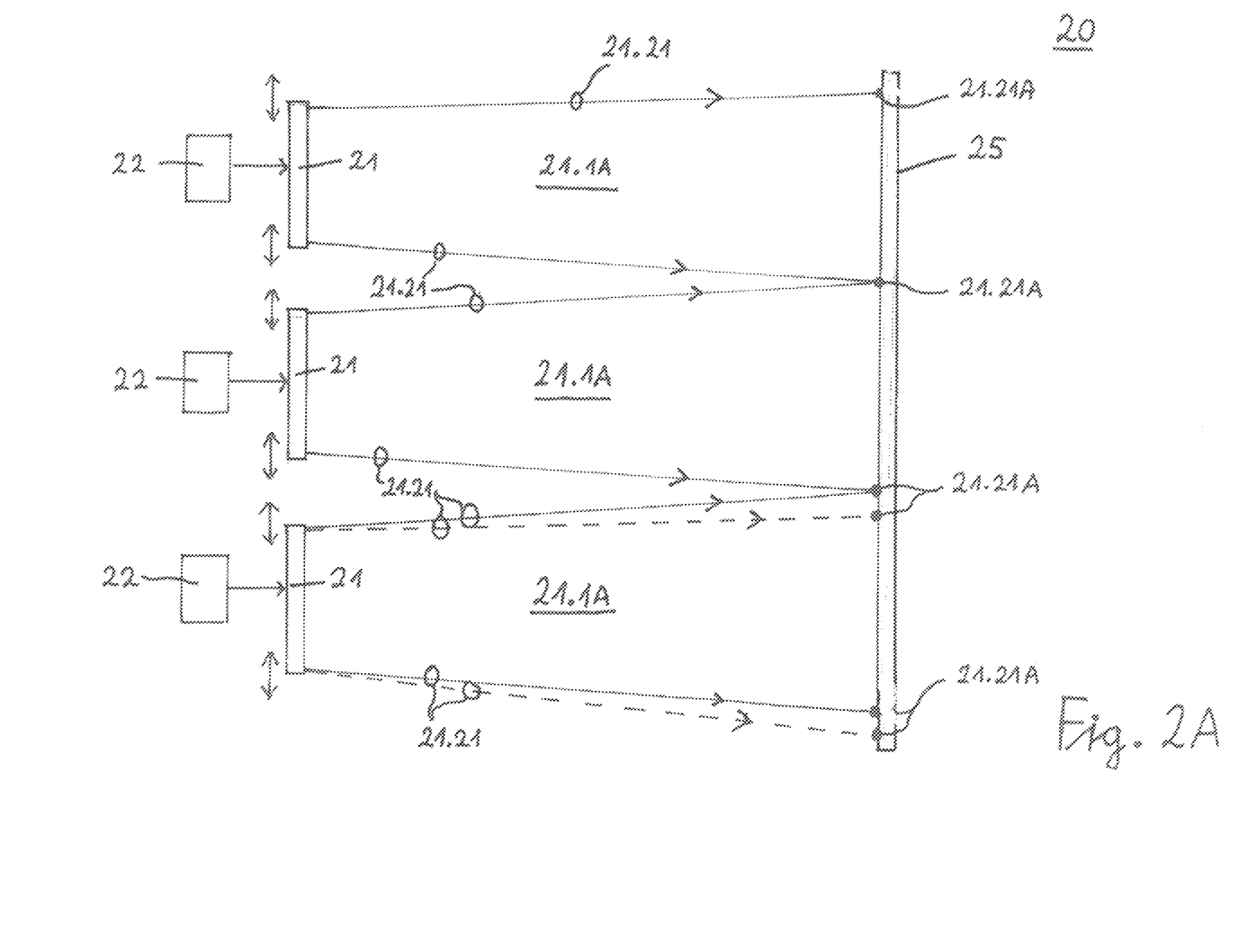
FIGS. 2A-2D show a schematic plan view of an exemplary lighting device or apparatus according to the first aspect of the disclosure, in which there are three lighting units on one side of the lighting apparatus (A), a perspective view of the three lighting units of the lighting apparatus (B), a plan view of a lighting unit with four laser diodes according to the second aspect of the disclosure, which can be used as the lighting unit for the lighting apparatus according to FIGS. 2A and 2B (C), and a plan view of an illumination unit with a laser diode and a beam deflector according to the second aspect of the disclosure, which can alternatively be used as an illumination unit for the illumination apparatus according to FIGS. 2A and 2B (D).
Figure 2B:
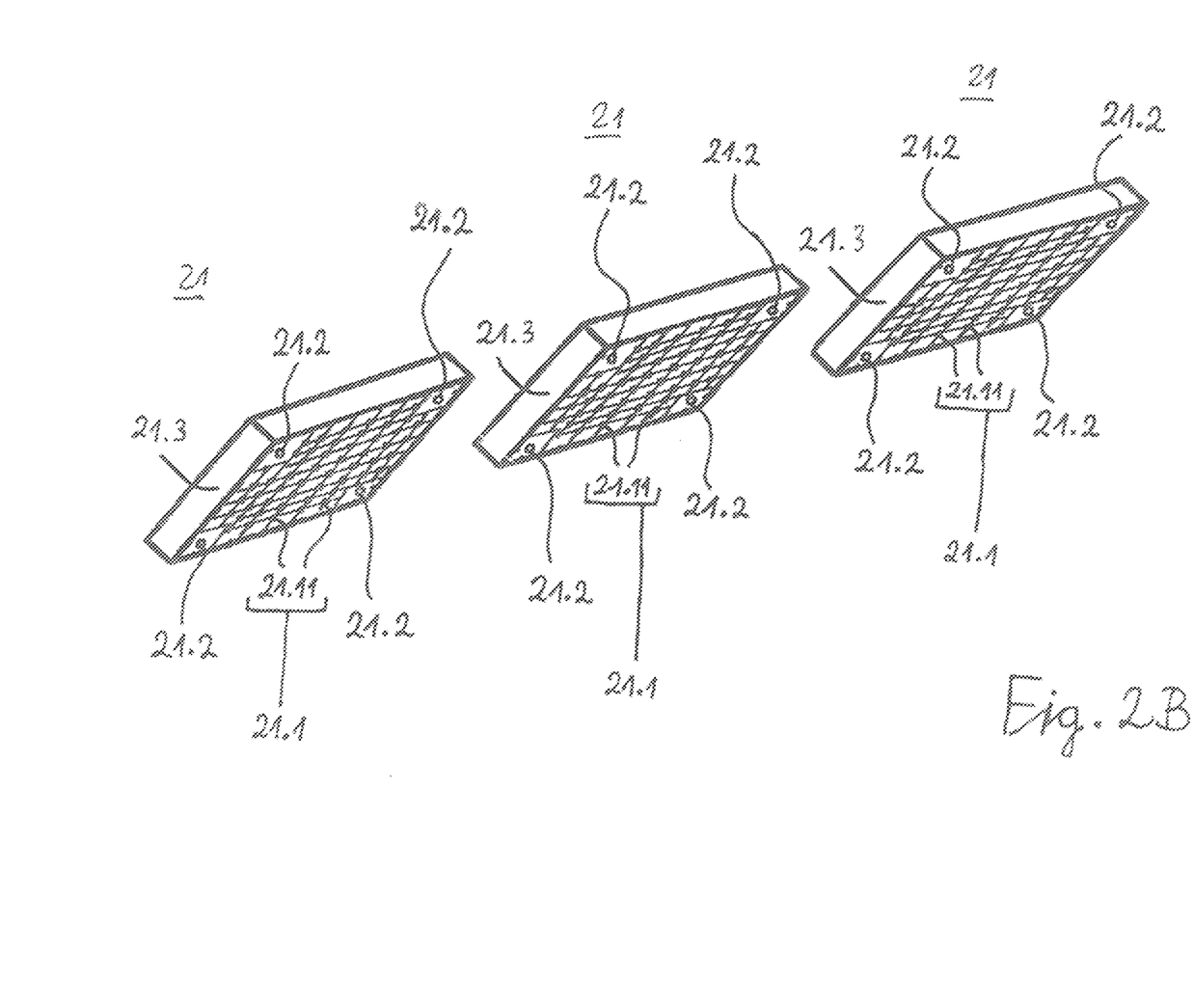
Figure 2C:
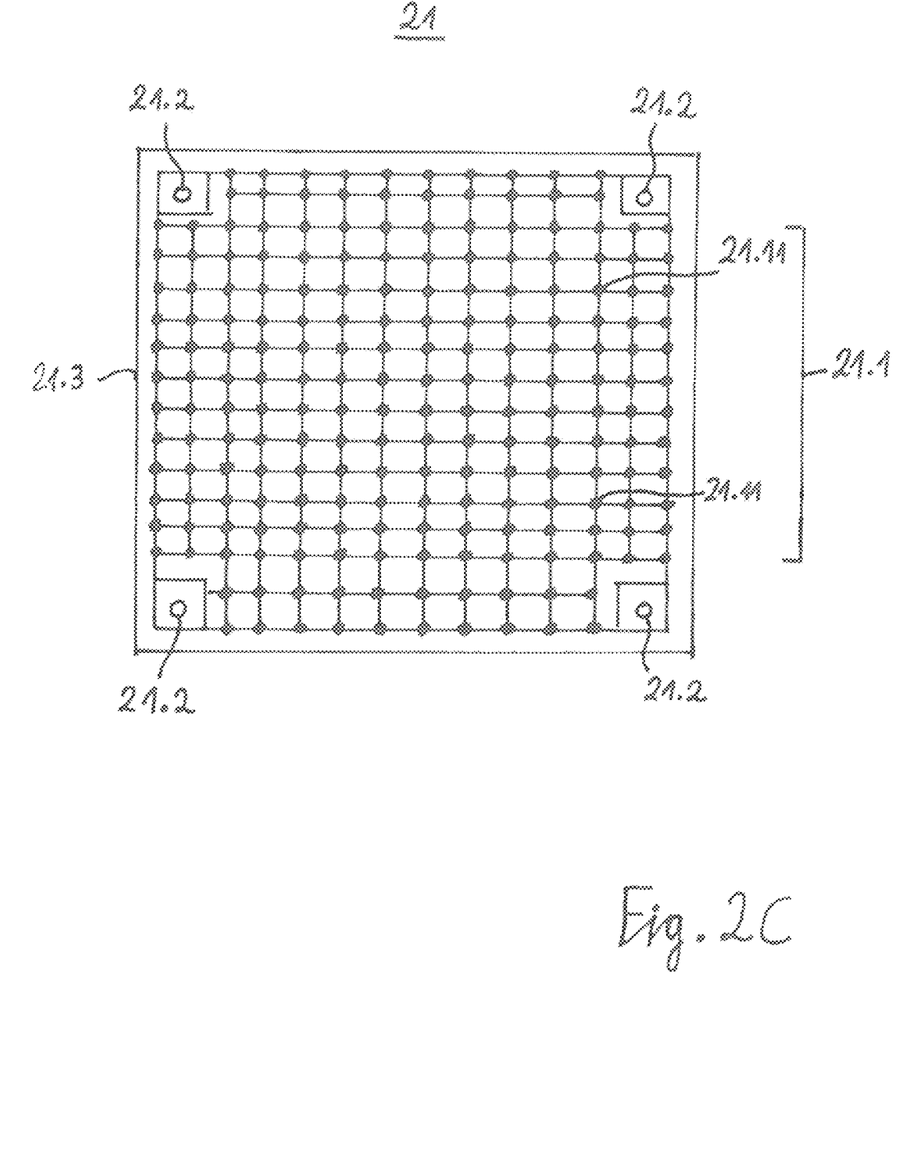
Figure 2D:
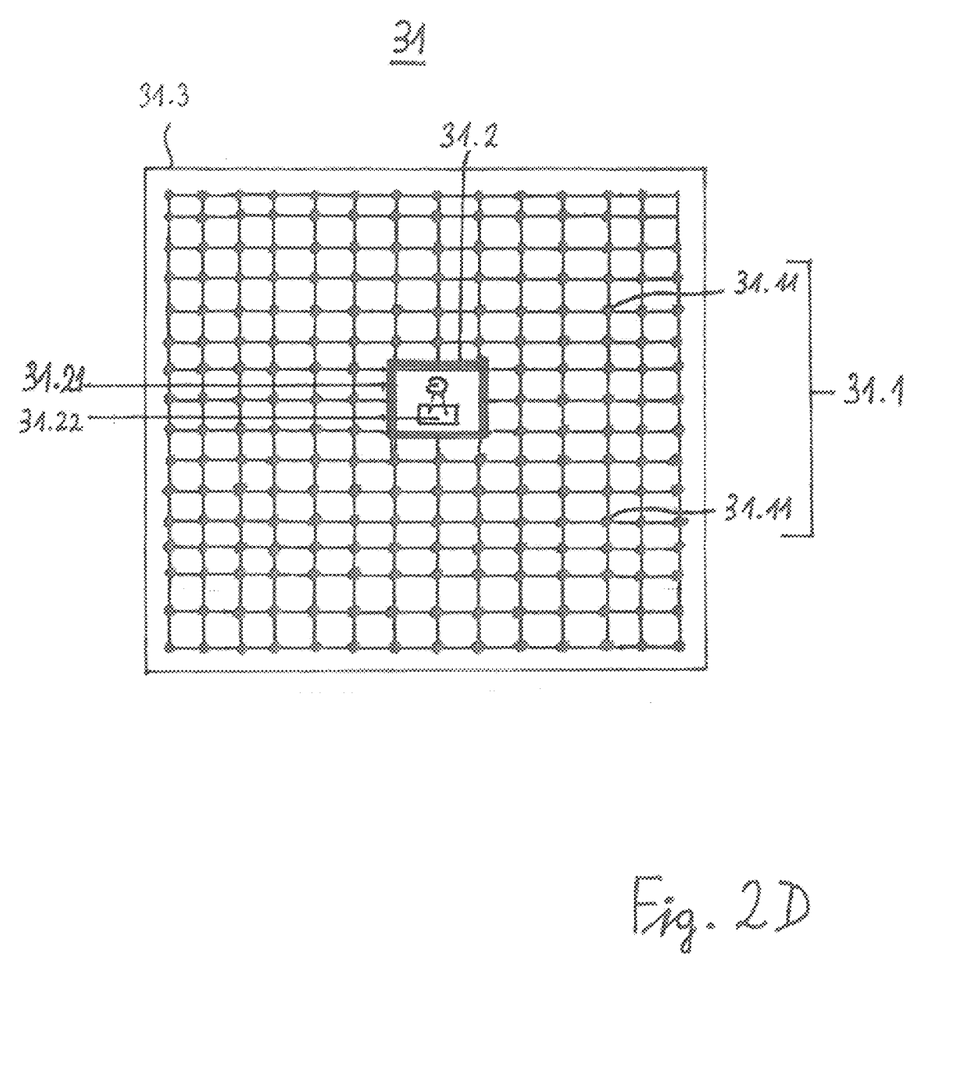

FIG. 2 shows FIGS. 2A-2D and shows an example of a lighting device according to the first aspect of the disclosure (FIGS. 2A, 2B) and examples of a lighting unit according to the second aspect (FIGS. 2C, 2D).

The illumination device or apparatus 20 according to the first aspect of the disclosure has a plurality of illumination units 21, each illumination unit 21 comprising a light source 21.1 for emitting a radiation beam 21.1A and laser beam sources 21.2 for emitting a laser beam 21.21. The illumination device 20 further comprises a plurality of actuator means 22, each actuator means 22 being connected to an illumination unit 21 and being adapted to change an emission direction of the radiation beam 21.1A based on a detected beam direction of the laser beam 21.21.

The illumination unit according to the second aspect, as shown for example in FIG. 2C, comprises a light source 21.1 for emitting a radiation beam 21.1A and a laser beam source 21.2 for emitting a laser beam 21.1A, wherein the laser beam source 21.2 is arranged and adapted to mark the spatial extension of the radiation beam 21.1A at a distance from the illumination unit 21 by means of the emitted laser beam 21.2A. In particular, the laser beam source 21.2 is aligned in such a way that the beam direction of the emitted laser beam is parallel to the beam direction at the edge of the radiation beam 21.1A in order to image the divergence of the radiation beam 21.1A in this way.

According to the example of an illumination device 20 shown in FIG. 2, each of the illumination units 21 has exactly four laser beam sources 21.2. However, it should already be noted at this point that for the purposes of the present disclosure, a single laser beam source may also be sufficient. An example of this will be given below.

According to an example of the illumination device 20 according to the first aspect and the illumination unit according to the second aspect, the light source 21.1 has a plurality of LEDs 21.11 arranged in a matrix, especially white light LEDs 21.11. Alternatively, the light source 21.1 can also be provided by a halogen gas discharge lamp.

According to an example of the illumination device 20 according to the first aspect and the illumination unit according to the second aspect shown in FIG. 2, the laser beam source has four laser diodes 21.2, the radiation beam 21.1A has a substantially rectangular cross-section, and the four laser diodes 21.2 are arranged in such a way that each of the laser beams 21.21 emitted by them runs at one of the four corners of the rectangular cross-section of the radiation beam 21.1A parallel to the direction of emission at the edge of the radiation beam 21.1A. However, other constellations are also conceivable in which the number of laser diodes is less than four, for example two or even only one laser diode. An example of this is shown below in FIG. 2D.

According to an example of the illumination device 20 according to the first aspect and the illumination unit according to the second aspect, the laser beam sources 21.2 each have a laser diode, for example a laser diode emitting in the visible spectral range.

According to an example of an illumination device 20 according to the first aspect and the illumination unit according to the second aspect, the at least one laser beam source 21.2 is configured in such a way that it marks the spatial position and the size of the radiation field of the radiation beam 21.1A emitted by the illumination unit 21 at a predetermined distance from the respective illumination unit 21. The predetermined distance can be given, for example, by the distance from the illumination unit 21 to a central longitudinal axis of a motor vehicle intended for a crash test. In the vicinity of this plane, it is desirable that the radiation fields of the radiation beam 21.1A emitted by two adjacent illumination units 21 should be as close as possible to each other without gaps or overlaps. When adjusting the illumination device 20, for example, a suitable projection surface 25 can be arranged in this plane on which the radiation beam 21.1A and the laser beam(s) 21.21 are projected. The impact of the laser beams 21.21 emitted by two laterally adjacent illumination units 21 on the projection surface 25 can then be detected in a suitable manner and on this basis the direction of emission of the illumination unit 21 can be changed.

According to an example of the illumination device 20 according to the first aspect and the illumination device according to the second aspect, the beam 21.1A is usually slightly divergent so that the beam directions at the edges of the beam cross section are at an angle other than 0° from the vertical, as best seen in FIG. 2A. The radiation directions of the laser beams 21.21 are to be set accordingly in such a way that they run parallel to the beam direction at the edge of the beam 21.1A, i.e. they thus image the divergence of the beam. This ensures that the points of incidence 21.21A of the laser beams 21.21 on the projection surface 25 are located as exactly as possible at the corners of the radiation field of the radiation beam 21.1A and thus reflect the size of the radiation field enclosed by them. The laser diodes 21.2 can be permanently mounted inside the housing 21.3 of the illumination unit 21 so that their direction of radiation is unchangeable. Alternatively, however, it may also be provided that the laser diodes 21.2 are arranged within the housing 21.3 in such a way that they are movable, in particular adjustable with respect to their direction of emission, so that their directions of emission can be adapted, if necessary, to changed divergence characteristics of the radiation beam 21.1A.

This is illustrated in more detail in FIG. 2A. At a desired distance from the illumination units 21, the projection surface 25 is arranged on which the radiation beams 21.1A and the laser beams 21.21 are projected. The laser beams 21.21 projected on the projection surface 25 are optically detectable and can be used to optimally place the radiation fields next to each other by changing the alignment of the illumination units 21, for example by an automated procedure. For this purpose, the points of incidence 21.21A of laser beams 21.21 of adjacent illumination units 21 must be overlapped. FIG. 2A shows a situation in which the uppermost and the middle illumination unit 21 overlap with such adjacent impact points 21.21A. With regard to the middle and the lowest illumination unit 21, the dotted laser beams 21.21 represent an initial situation in which the points of impact 21.21A of the laser beams 21.21 do not coincide on the projection surface 25. This can be detected, as will be shown below, by a suitable detection device, whereupon a control device connected to it causes actuator means 22 to change the direction of emission of the illumination units 21 in such a way that the points of incidence of the laser beams 21.2A of adjacent illumination units 21 are made to overlap with each other. In the case shown, the actuator means 22 connected to the lowermost illumination unit 21 would, for example, cause the illumination unit 21 to be swiveled about an axis perpendicular to the plane of representation in order to change the direction of emission of the laser beams 21.21 which are given by the traced laser beams 21.21 after the swiveling operation. In addition or alternatively the actuator means 22 may also cause a lateral adjustment of the illumination unit.

According to an example of the illumination device 20 according to the first aspect, the illumination units 21 are mounted in such a way that by appropriate control by the actuator means 22 their orientation and thus the direction of emission of the beams 21.1A can be changed. The direction of radiation can be changed both by translation and rotation of the illumination units 21. For example, the illumination units 21 can be arranged next to each other on a rail and can be movable in the longitudinal direction of the rail, as indicated by the arrows in FIG. 2A. Furthermore, the illumination units 21 can be rotated or swiveled about two or three axes.

According to an alternative example of the first aspect illumination device 20 and the second aspect illumination unit, the radiation beam has a non-rectangular cross-section, such as a circular cross-section, in which case four laser diodes may be arranged at the positions 0°, 90°, 180°and 270° of the circumference of the circle, so that each of the laser beams emitted by them is substantially parallel to the direction of emission at the edge of the radiation beam.

According to an example of the illumination device 20 according to the first aspect and the illumination unit according to the second aspect, the beam direction of the laser beam of the laser beam source is time-varying, especially in case only one or two laser beam sources such as laser diodes are used. According to another example, the beam direction of the laser beam is time-variable in such a way that when the laser beam is projected onto a projection surface, the laser beam draws a rectangle which encloses the radiation field of the radiation beam of the illumination unit. According to another example, the laser beam would draw a single line on the projection surface, which for example indicates an outer boundary line of the radiation field. According to another example, an illumination device has a single laser beam source, in particular a laser diode, which additionally has a beam deflection device, which is set up to deflect the laser beam in a desired manner that is variable over time. According to a further example, such a beam deflection device comprises a galvanometer.

An example of this is shown in FIG. 2D, in which a further illumination unit 31 is shown according to the second aspect. Like the illumination unit 21 in FIG. 2C, the lighting unit 31 has a rectangular housing 31.3, in the front of which a light source 31.1 is installed, which has a matrix-like arranged plurality of white light LEDs 31.11. In contrast, the illumination unit 31 has only one laser beam source 31.2, which, for example, is installed in the center of the plurality of white light LEDs 31.11 in the housing and has a laser diode 31.21 and a deflection device 31.22. The deflector 31.22 can be a galvanometer, for example. The laser beam emitted by the laser diode 31.21 is fed to the deflecting device 31.22 and deflected by the latter in such a time-dependent manner that it draws a rectangle on a projection surface at a distance from the illumination unit 31, which marks the spatial extension of the radiation beam.

Figure 3:
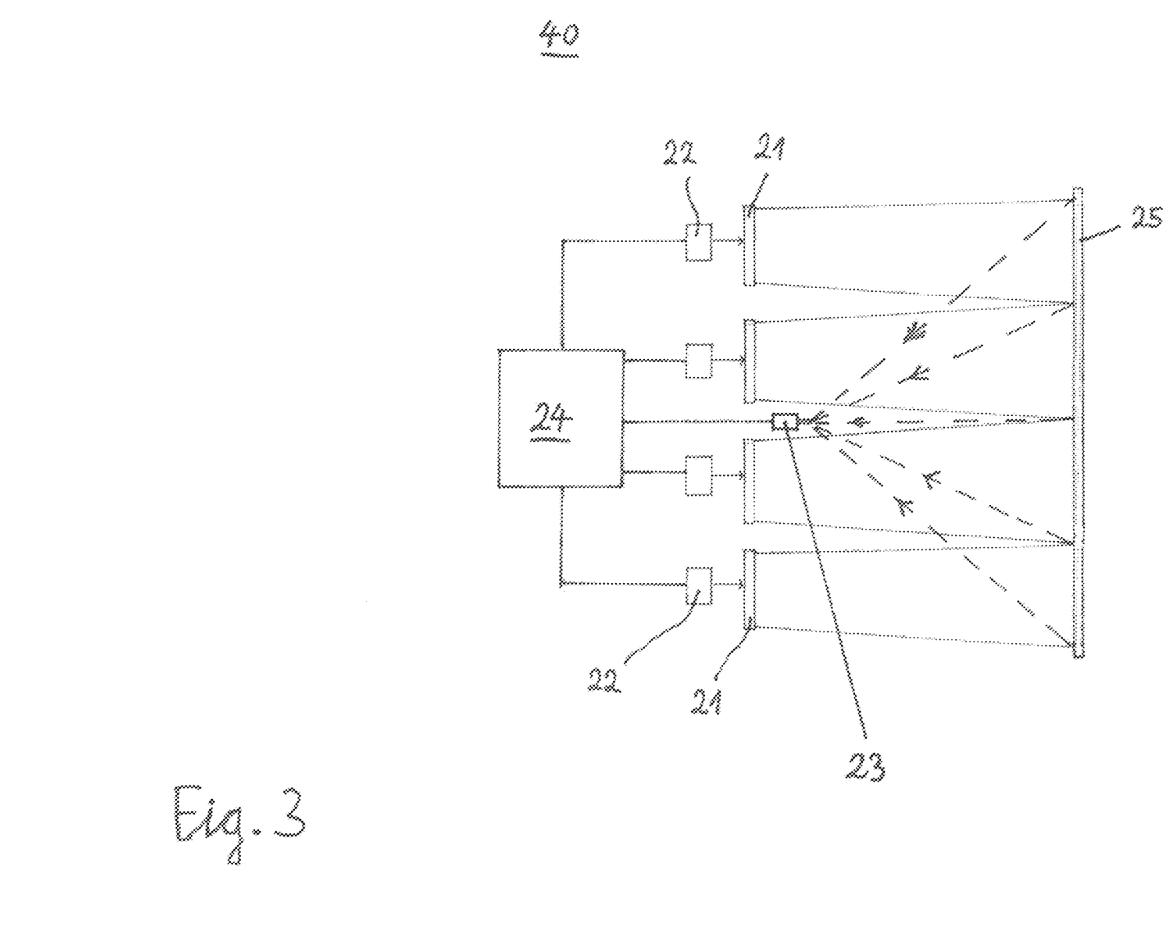
FIG. 3 shows a schematic plan view of an exemplary illumination device according to the first aspect of the disclosure, in which a control device for controlling the actuator means is provided and the control device is connected to a detection device for detecting the beam directions of the laser beams.

FIG. 3 schematically shows a further version of an illumination device 40 after the first aspect.

According to an example of an illumination device 40 according to the first aspect, the illumination device 40 thus further comprises a detection device 23 which is set up to detect the beam direction of the laser beam or the points of incidence of the laser beam on the projection surface 25. According to another example thereof, the detection device 23 comprises an optical sensor, in particular a camera such as a CCD camera. As indicated by the dotted lines, the entire area of the projection surface 25 in which points of incidence 21.21A of the laser beams 21.21 are present is imaged on the detection device 23. Subsequently, the recorded pattern can be subjected to image processing and, based on the result of this image processing, suitable control signals can be sent to the actuator means 22 in order to move the illumination units 21 in a suitable manner.

According to an example of an illumination device 30 according to the first aspect, the illumination device 30 also has a control device 24, which may, for example, contain a device for image processing as described above. Alternatively, the image processing device may be included in the detection device 23. The control device 24 is connected to the actuator means 22 and is arranged to control the actuator means 22 in such a way that the orientations of the illumination units 21 are changed in such a way that the points of incidence of laser beams of adjacent illumination units 21 on the projection surface 25 are overlapped. In this way it is achieved that the radiation beams 21.1A adjoin each other in the plane of the projection surface 25 without gaps or overlaps. According to another example of this, the control device 24 is connected to the detection device 23 and is set up to receive a signal from the detection device 23 which contains a statement about which points of impact of adjacent illumination units 21 are still spaced apart from each other. On the basis of this signal, the control device 24 calculates all necessary adjustments of the illumination units 21 and accordingly forwards signals to the actuator means 22. The calculation by the control device 24 can be carried out in such a way that the number of necessary adjustments of the illumination units 21 is minimized.

Further embodiment examples can be created by combining features and examples as described above in connection with a lighting device according to the first aspect.

Figure 4:
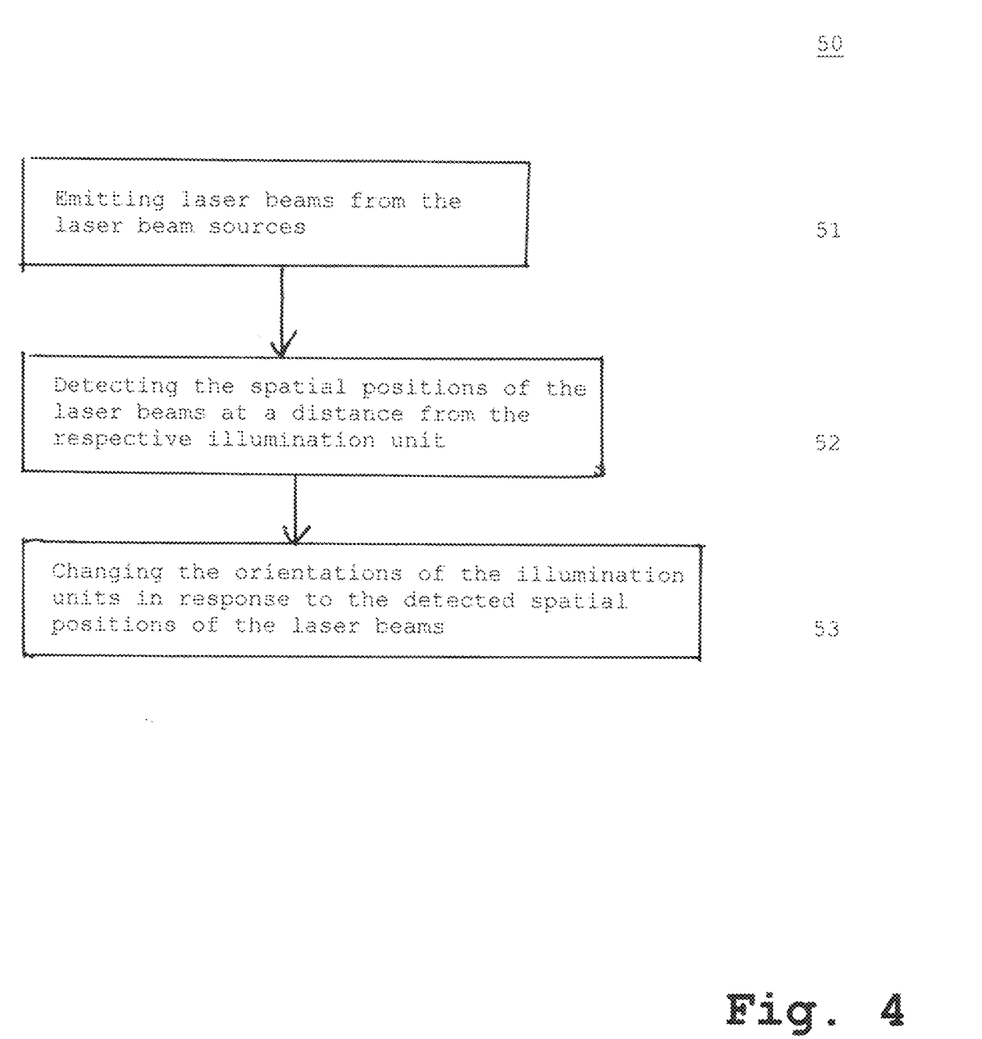
FIG. 4 shows a flow diagram explaining an exemplary method for adjusting an illumination device according to the third aspect of the disclosure.

FIG. 4 shows a flow diagram for a procedure for adjusting a lighting device according to a third aspect of the disclosure.

According to FIG. 4, a method 50 for adjusting an illumination device or apparatus comprising a plurality of illumination units each comprising a light source and a laser beam source, comprises emitting laser beams from the laser beam sources (51), detecting the spatial positions of the laser beams at a distance from the respective illumination unit (52), and changing the orientations of the illumination units in response to the detected spatial positions of the laser beams (53).

According to an embodiment example of the method according to the third aspect, the orientations of the illumination units are changed in such a way that the radiation beams adjoin each other at a predetermined distance from the illumination device without gaps and without overlapping.

Further embodiment examples can be formed by combining features and embodiment examples such as those described above in connection with an illumination device according to the first aspect and an illumination unit according to the second aspect.

Although specific embodiments have been shown and described in this description, it is clear to the professional in the field that the specific embodiments shown and described can be exchanged for a variety of alternative and/or equivalent implementations without departing from the scope of protection of this disclosure. This application is intended to cover any adaptations or modifications of the specific embodiments discussed herein. It is therefore intended that this disclosure is limited only by the claims and their equivalents.

The invention claimed is:

1. An illumination device comprising:
a plurality of illumination units, each illumination unit of the plurality of illumination units comprising a light source for emitting a radiation beam and at least one laser beam source for emitting at least one laser beam;
a plurality of actuator devices, each actuator device of the plurality of actuator devices being connected to an illumination unit of the plurality of illumination units and configured to change a spatial position or spatial orientation of the illumination unit based on a detected beam direction of the laser beam; and
a control device connected to the actuator devices and configured to control the actuator devices in such a way that the spatial positions or spatial orientations of the illumination units are changed in such a way that the radiation beams adjoin one another at a predetermined distance from the illumination device without gaps and without overlapping.

2. The illumination device according to claim 1, wherein: the laser beam source is arranged and designed to mark a spatial extension of the radiation beam at a distance from the illumination unit using the laser beam.

3. The illumination device according to claim 2, wherein: the laser beam source comprises four laser diodes; the radiation beam has a substantially rectangular cross-section; and
the four laser diodes are arranged such that each of the laser beams emitted by the four laser diodes is substantially parallel to a direction of emission of the radiation beam in a vicinity of one of four corners of the substantially rectangular cross-section of the radiation beam.

4. The illumination device according to claim 3, further comprising:
a detection device configured to detect the beam direction of the laser beam.

5. The illumination device according to claim 2, further comprising:
a detection device configured to detect the beam direction of the laser beam.

6. The illumination device according to claim 1, wherein: the beam direction of the laser beam is variable in time.

7. The illumination device according to claim 6, wherein: the laser beam source comprises a beam deflection device configured to deflect the laser beam in a desired manner which is variable in time.

8. The illumination device according to claim 7, wherein: the beam deflection device comprises a galvanometer.

9. The illumination device according to claim 7, wherein: the beam deflection device consists of a galvanometer.

10. The illumination device according to claim 6, further comprising:
a detection device configured to detect the beam direction of the laser beam.

11. The illumination device according to claim 1, further comprising:
a detection device configured to detect the beam direction of the laser beam.

12. The illumination device according to claim 11, wherein:
the detection device comprises an optical sensor configured to detect an incidence of the laser beam on an object.

13. The illumination device according to claim 11, wherein:
the detection device comprises an optical sensor configured to detect an incidence of the laser beam on a projection surface of an object.

14. The illumination device according to claim 1, further comprising:
a detection device configured to detect the beam direction of the laser beam, the control device connected to the detection device.

15. A use of the illumination device according to claim 1 in a simulation arrangement for motor vehicle accidents.

16. A method of adjusting an illumination device comprising:
a plurality of illumination units, each illumination unit of the plurality of illumination units comprising a light source for emitting a radiation beam and at least one laser beam source for emitting at least one laser beam;
a plurality of actuator devices, each actuator device of the plurality of actuator devices being connected to an illumination unit of the plurality of illumination units and configured to change a spatial position or spatial orientation of the illumination unit based on a detected beam direction of the laser beam; and
a control device connected to the actuator devices and configured to control the actuator devices in such a way that the spatial positions or spatial orientations of the illumination units are changed in such a way that the radiation beams adjoin one another at a predetermined distance from the illumination device without gaps and without overlapping,
wherein the method comprises
emitting laser beams from the laser beam sources;
detecting a spatial position of the laser beams; and
changing the spatial position or spatial orientation of the illumination units depending on the detected spatial positions of the laser beams.

17. The method according to claim 16, wherein: alignments of the illumination units are changed in such a way that the radiation beams emitted from the light sources adjoin each other at the predetermined distance from the illumination device without gaps or overlaps.

* * * * *